Dec. 5, 1933.  H. C. MORRIS  1,938,108

SAWMILL

Filed Nov. 11, 1931  5 Sheets-Sheet 2

Fig. 4

Hubert C. Morris
Inventor

Attorney

Dec. 5, 1933.   H. C. MORRIS   1,938,108
SAWMILL
Filed Nov. 11, 1931   5 Sheets-Sheet 5

Hubert C. Morris
Inventor
Attorney

Patented Dec. 5, 1933

1,938,108

UNITED STATES PATENT OFFICE 1,938,108

SAWMILL

Hubert C. Morris, Albany, Oreg.

Application November 11, 1931
Serial No. 574,420

16 Claims. (Cl. 144—116)

My invention relates to saw mills. It has for its primary purpose and object the preparing of relatively small logs for being reduced to boards by the passing of the log but once through a gang saw, and for causing the log to lie in sawing position while being passed through the gang saw.

My invention is comprised primarily of a feeding end having means associated therewith for positioning the log to be sawed thereupon and to maintain the same in position for being fed past a cutter head and for thereafter being delivered upon a table that will deliver the same to a gang saw and for reducing the log thus prepared to boards.

Independent power means are provided for the flattening of the log upon its oppositely disposed side by the passing of the log but once through the saw mill.

Heretofore it has been the general custom in the timbered areas where relatively large trees are produced, in the logging operation to leave the smaller logs and/or trees in the woods because it was uneconomical to saw large and small logs in the same saw mill, and to log large and small logs in the same logging operation.

Through the use of my new and improved saw mill I flatten one or more sides of the log by the passing of the log through the mill but once. I thereafter transfer the log, thus prepared, to a gang saw where the same is reduced to boards to a desired thickness by the passing of the logs but once through the gang log saw. The reducing of the logs may be carried on as a continuous operation by the feeding of the logs continuously in the same direction through my mill and thereafter through the gang saw.

Heretofore it has also been the general custom to flatten the surface of the log by the cutting of slabs from the sides of the log in the initial cutting operation. This produced a mill waste product that required a large amount of physical labor in the handling of the mill waste and also produced a product having a limited amount of sale and being uneconomical to dispose of, which required, in the larger milling operations, the building of refuse burners and slab conveyors that caused large expenditures of money in the disposition of the slab in the refuse burner and in the handling of the slab from the mill to their final point of disposition within the mill.

It has now become quite general practice to comminute these slabs by the passing of the same through hogs for the subsequent production of hog fuel. Through the use of my new and improved saw mill I flatten one, or more sides of the log by a cutter head that reduces the removed material, in the flattening of the log, to a comminuted state which permits the transferring of the comminuted material through the use of conveyors of the conventional type as well as through the use of air blast conveyors. This not only reduces the time required in the mill, but at the same time reduces the capital outlay in the mill, and very greatly lessens the amount of physical labor required in the mill operation. It simultaneously makes it economically possible to handle the small logs which heretofore have been left in the woods at great economic loss.

My invention is primarily comprised of a central frame into which the cutter heads are journaled, one of which is journaled upon a shaft mounted in fixed bearings, the other one of which is journaled in bearings that are positionably adjustable within the frame by power adjusting means. A log conveying carriage is disposed upon the feed end of the mill that is adapted for being power raised and lowered, to position the log relative to the fixed cutter head disposed therein. An endless conveyor is disposed within the feeding carriage having power manipulative means associated therewith for quickly positioning the log into cutting position. A reacting element is positioned within the frame adapted for adjustably supporting a plurality of counterweighted discs upon a shaft to adapt the discs to the contour of the log and for maintaining the same in desired position in its passage through the mill. A plurality of independent power units are provided each adapted for being manipulated by a single operator that stands at one side of the mill to facilitate the entire operation of the mill.

I comprise my cutter head of a plurality of teeth supporting bars fixedly positioned upon a shaft having removable cutter teeth disposed in their outer ends. The bars carrying the teeth are so positioned upon the driving shaft, or arbor, that single teeth may be removed from the bars without the removal of the bar from the shaft. This effects a very great saving in time in the adjusting of the teeth and insures efficient operation.

One of the primary objects of my invention consists in providing a saw mill that may be manipulated by a single operator and through the use of which, small logs may be economically and efficiently prepared for being positioned through a gang saw, as a continuous sawing operation and without the necessity of the reciprocating of the log, by one, or more passes, through the preparing mill.

A further object of my invention consists in providing suitable means for the flattening of one or more sides of the log, by the reducing of the removed material to a comminuted state, in the flattening operation.

A still further object of my invention consists in providing a saw mill, adapted for being manipulated by a single operator, through the use of which the log may be reduced to parallel surfaces upon its oppositely disposed sides, by the passing of the log, but once, through the mill and for the reducing of the removed material to a comminuted state in the flattening operation.

A still further object of my invention consists in so constructing my mill, that the same is comprised of few parts and that may be efficiently operated over long periods with freedom from mechanical, operating annoyances.

A still further object of my invention consists in providing a cutter head comprised of a plurality of teeth supporting bars having removable cutter teeth disposed in its oppositely disposed ends and so positioned on the supporting shaft, or arbor, that the teeth may be removed without the removal of the bar from the shaft, or arbor.

A still further object of my invention consists in driving the primary arbors, or shafts on which the cutter heads are positioned by directly connecting the same to the armatures of the prime mover.

And a still further object of my invention consists in so constructing the feeding carriage of the mill that the same may be raised and lowered relative to the primary shafts, or arbors that the log is positioned relative to the shafts and arbors by the raising and lowering of the carriage by power means to the desired height.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

My invention is primarily intended for the preparing of the log to be passed through the gang saw that is to be used in conjunction with my machine. This machine and a gang saw working together to saw logs primarily as a continuous operation by the passing of the same through my mill and the gang.

Heretofore it has been the general custom in saw mill operation particularly where large logs are involved to leave the smaller trees and logs in the woods. This was made necessary due to the fact that with present milling practice it has not been possible to economically handle small logs in conjunction with large logs in the same mill. The expense was further non-practical because there has been no means by which the small logs could be placed in condition to be passed through the gang saw.

Through the use of my new and improved device I have provided a suitable arrangement where the small log can be economically flattened into a straight line on one, or both sides by the passing of the same through the mill but once, thereafter it being an easy matter to pass the same through a gang saw to reduce the same to a finished material.

My device is primarily comprised of an endless feeding chain having means associated therewith to permit the easy rotating of the log to place the same in its best sawing position and to further place the same in desired position for the reducing of one or both sides of the same to parallel planes. Power operated chocks are disposed at spaced intervals along the chain. The chocks are adapted for maintaining the log in precise position during the cutting operation. Adjustable holding down rollers, comprised of a plurality of sections are disposed at one end of the mill. The rollers are adapted to engage logs of varying diameters upon the top side.

Heretofore in most milling operations the initial cutting was done through the use of saws which produced a slab that was difficult to handle and required considerable mechanical and physical effort in doing so. Through the use of my new and improved device I use dado heads for the saw. The dado head is comprised of a plurality of units having teeth inserted therein at each end. The dado head reduces the material in an initial cut into a comminuted state that may be thereafter handled by air or chain conveyors for the carrying of the same from the mill to a burning pile, or to reduce the same for use as hog fuel.

I place my machine upon a suitable base 1, of sufficient length to accommodate the entire mill structure thereupon and to meet the requirement of a portable mill so that the mill may be moved from place to place to eliminate the necessity of transporting of the logs over relatively long distances to the mill itself.

On the feeding, or carriage end of the mill I make the same of structural members primarily comprised of a subbase 2, crossbeams 3 and a top frame 4 that run in parallel planes to the subbase 2. The subbase 2 rests upon crossbeams 5 and 6. The crossbeams rest directly upon the bell crank supports 7 and 8. The bell cranks are secured together by a rod 9. The rod 9 has a turn buckle 10 disposed therein. The purpose is to provide facilities for the raising and lowering of the frame to maintain the log carriage in a substantially horizontal position and to position the log to the desired elevation without the necessity of jacking up, or blocking up the base. The raising and lowering of the carriage and cradle structure is further made because of the necessity of raising and lowering of the log to predetermine the amount of cut that is to be taken off the bottom side of the log.

Figure 4:
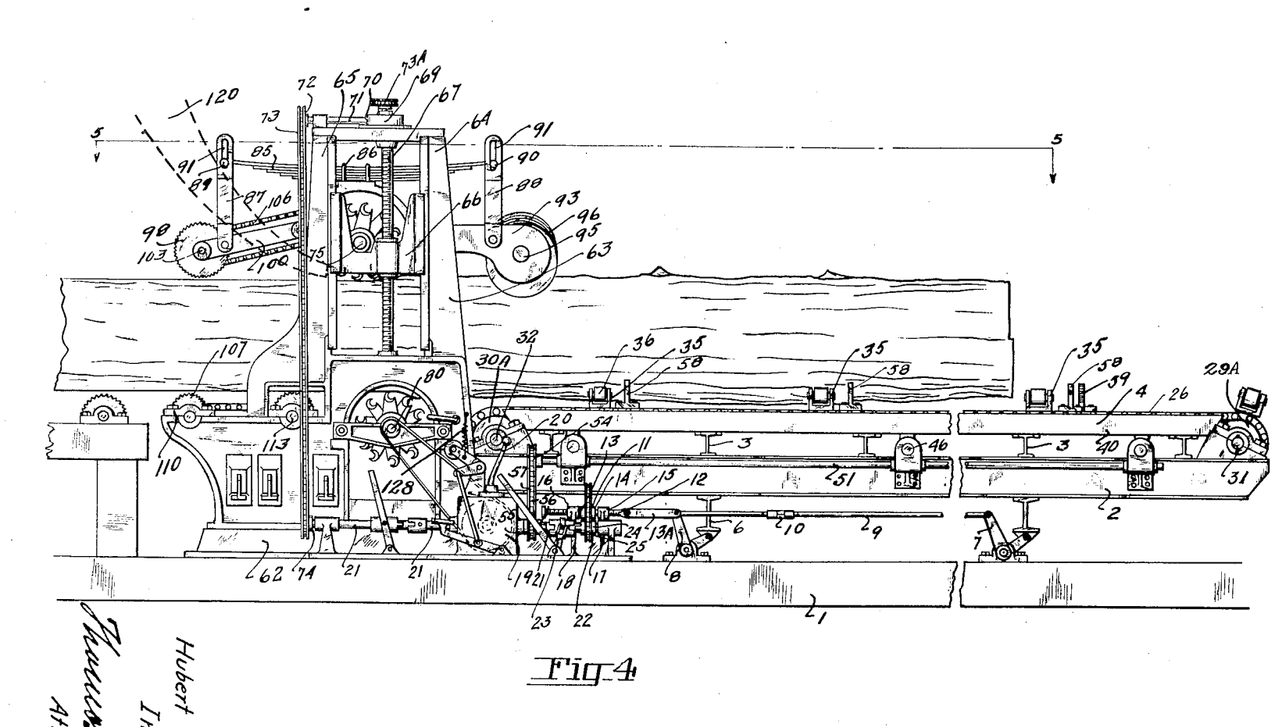
Fig. 4 is a side view of the assembled device. The same is a side view of the operator's side of the mill.

A sprocket 11 as illustrated in Fig. 4, is maintained upon a threaded shaft 12 and the threaded shaft 12 is secured to the bell crank 8 by a link 13A. The ends of the hubs 13 and 14 of the sprocket 11 directly engage the stops 15 and 16 that are formed integral with the brackets 17 and 18 upon which the same rest and the rotation of the sprocket 11 upon the threaded shaft 12 imparts longitudinal movement to the shaft 12 and to the bell cranks. The rotating of the sprocket 11 in one direction raises the entire cradle and carriage assembly and the rotating of the sprocket 11 in the opposite direction reverses the direction of movement.

Figures 5, 6:
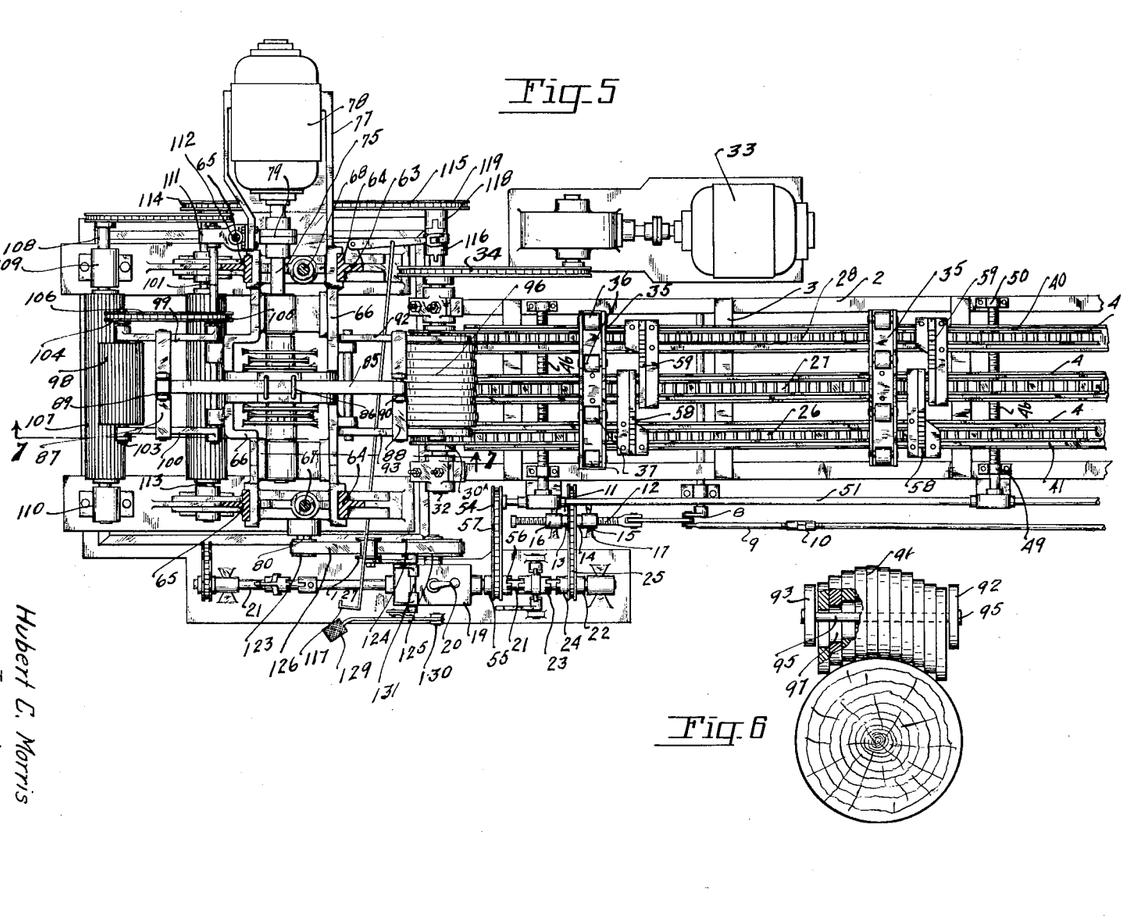
Fig. 5 is a fragmentary, top, plan view of the mechanism illustrated in Fig. 4. The same is taken on line 5—5 of Fig. 4, looking in the direction indicated.
Fig. 6 is a fragmentary, sectional, front view of the feed and locator rolls disposed upon the feeding end of the mill.
Figures 7, 13:
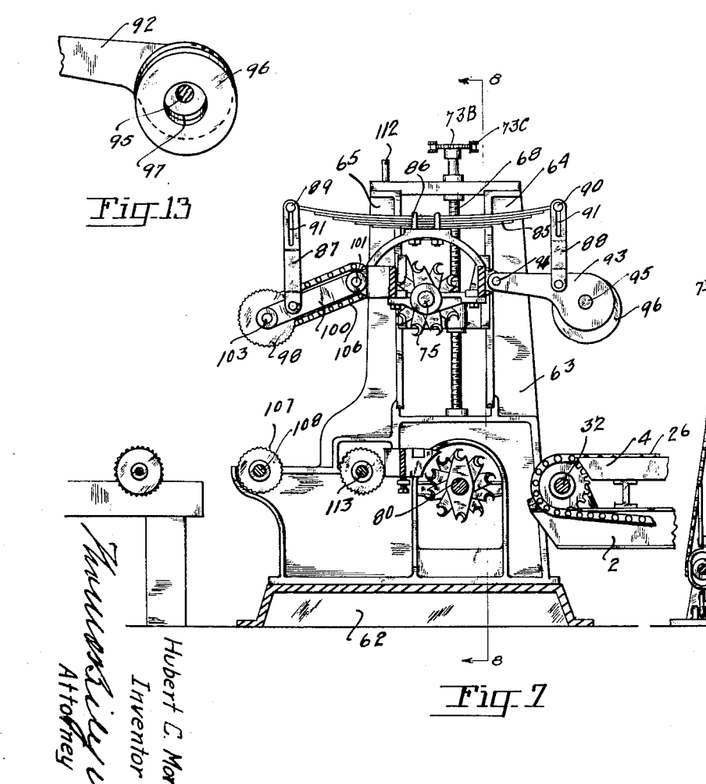
Fig. 7 is a fragmentary, sectional, side view of the frame portion and of the primary arbor of the mill. The same is taken on line 7—7 of Fig. 5, looking in the direction indicated.
Fig. 13 is a fragmentary, sectional, perspective, end view of the shaft and the locator, counterweight discs disposed thereupon for positioning the log and for maintaining the same in alignment.
Figure 8:
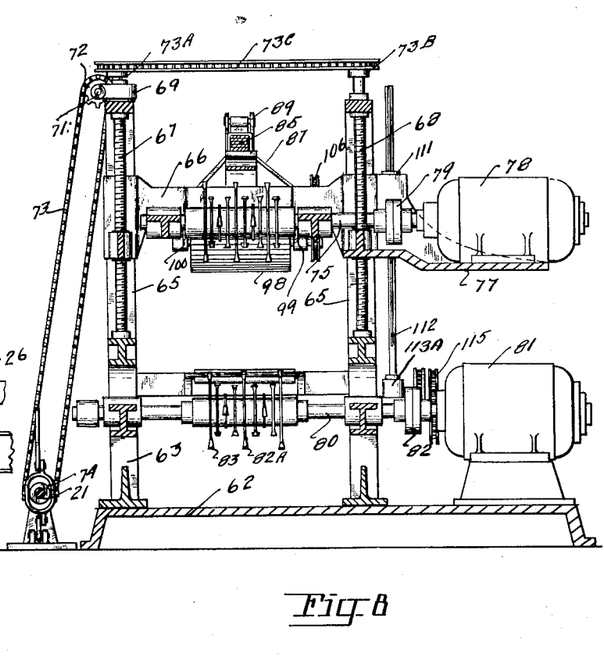
Fig. 8 is a fragmentary, sectional, end view, of the mechanism illustrated in Fig. 7. The same is taken on line 8—8 of Fig. 7, looking in the direction indicated.

A power driven gear box 19, illustrated in Fig. 5, is mounted at one side of the machine and a shift lever 20 determines the direction of rotation of the shaft 21 running through the gear box and being driven thereby. A sprocket 22 is mounted upon the shaft and a clutch 23 is driven by the shaft 21. The clutch 23 is adapted for engaging the hub 24 of the sprocket 22. A driving chain 25 is trained about the sprockets 11 and 22 respectively and the direction of rotation of the respective sprockets is predetermined by the movement of the lever 20. Endless chains 26, 27 and 28 are disposed within the cradle. The chains 26 and 28 are trained about sprockets 29A and 30A that are positioned in the oppositely disposed ends of the carriage. The sprockets are mounted upon cross shafts 31 and 32 that are journaled within suitable bearings disposed within the respective ends of the carriage. The power for driving the respective chains is taken from the prime mover as an electric motor 33, and is delivered to the shaft 32 through a driving chain 34.

A plurality of roller frames 35 are secured to the center chain 27 and pairs of rollers 36 and 37 are mounted upon the oppositely disposed ends of each of the roller frames. The upper surface, of the central part of the roller frame, has downwardly and inwardly sloping top surfaces 38 and 39 with the rollers projecting thereabove so that the log, when mounted upon the rollers, will roll free.

Figure 9:
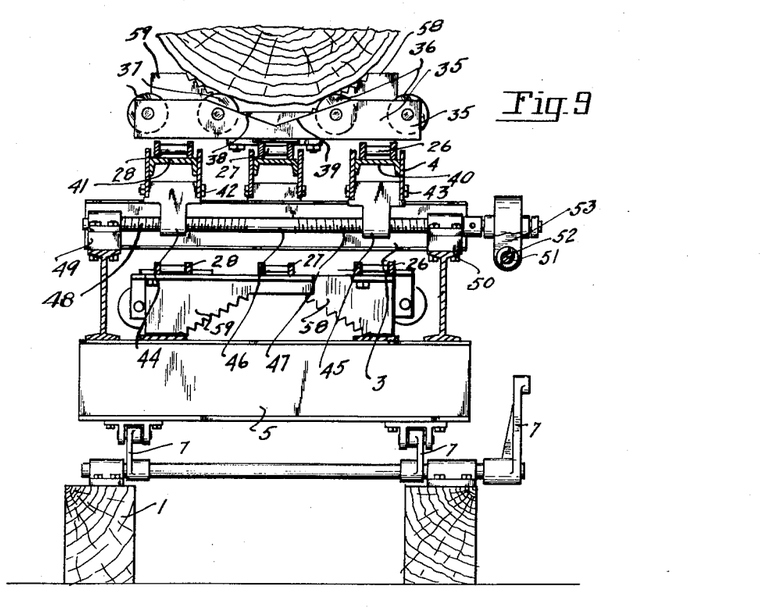
Fig. 9 is a fragmentary, sectional, end view of the mechanism illustrated in Fig. 1. The same is taken on line 9—9 of Fig. 1, looking in the direction indicated. This view is made to illustrate the cradle construction upon which the log rides and illustrates the log as being disposed upon rollers disposed within the cradle to aid in the positioning of the log preparatory to its being fixed upon the cradle.
Figure 10:
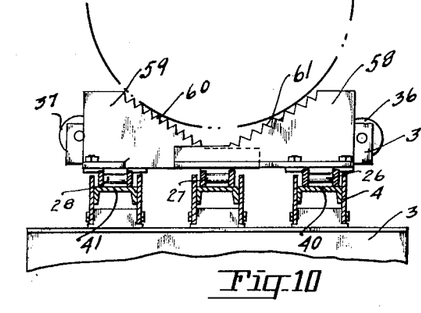
Fig. 10 is a fragmentary, sectional, end view of the cradle structure upon which the log rests while being passed through the mill. The same illustrating the chock blocks in position upon the cradle for supporting the log while being passed through the mill.
Figure 11:
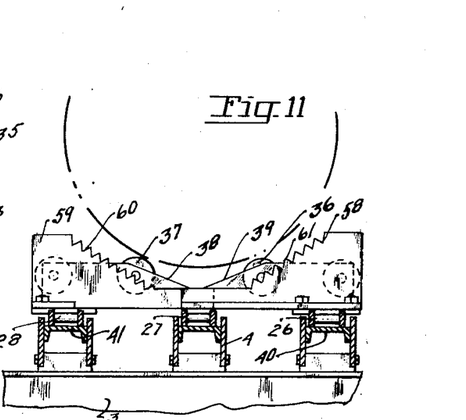
Fig. 11 is a fragmentary, sectional, end view of the cradle illustrating the chock blocks separated to permit the log disposed upon the rollers being turned into desired placement.

Referring to Fig. 9, the outside chains 26 and 28 move within guideway channels 40 and 41. The guideway channels are supported upon supporting cross beams. The journal pins 42 and 43 are positioned within adjusting and supporting blocks 44 and 45. The adjusting and supporting blocks 44 and 45 are mounted upon a threaded shaft 46. The threaded shaft 46 has a right hand thread 47 disposed upon one end and a left hand thread 48 disposed upon its oppositely disposed end so that as the shaft is rotated movement to the blocks 44 and 45 is imparted longitudinally of the threaded shaft 46. The threaded shaft 46 is journaled within suitable bearings 49 and 50 disposed at the oppositely disposed sides of the structure. A power driven shaft 51 runs longitudinally of the carriage and a plurality of worms 52 are mounted upon the shaft. The worms 52 are adapted to coact with and drive worm wheels 53. The shaft 51 has a sprocket 54 mounted thereupon and a sprocket 55 is mounted upon the reversing power driven shaft 21. The clutch 23 is adapted for being made to engage within the clutch 56 formed integral with the sprocket 55 and the movement of the clutch 23 into engagement with the clutch face of the sprocket 55 drives the sprocket and the chain 57 that is trained about the respective sprockets 54 and 55. The direction of rotation of the shaft 51 is predetermined by the shifting of the lever 20, as heretofore described.

Coacting chocks 58 and 59 are mounted upon the outside chains 26 and 28 respectively, and as the chains are moved transversely of the supporting structure, the chocks are made to engage the logs after the log has been positioned and prevents the further rotation of the same, during sawing. The chocks have corrugated surfaces 60 and 61. When the chocks have been moved outward the log is free to be rolled upon the rolls and when the chocks have been moved and made to forceably engage the log the same rests jointly upon the corrugated surfaces of the chocks and upon the rollers.

A base 62, is mounted upon the base 1 and a frame 63 upwardly extends therefrom and is secured thereto. Guide knees 64 and 65 upwardly extend from the base and are formed integral with the frame 63, and a supporting head 66 is adapted for being power raised and lowered within the guide knees 64 and 65. The supporting head 66 is adapted for being raised and lowered by power driven screws 67 and 68.

The power driven screw 67 has a worm wheel 69 disposed at its top end and a worm 70 coacts therewith. The worm 70 is mounted upon a shaft 71 and a sprocket 72 is mounted upon the shaft 71. A chain 73 is trained about the sprocket 72 and about a sprocket 74 and the sprocket 74 is disposed upon the shaft 21. The direction of rotation of the shaft 21 has heretofore been described which also predetermines the direction of the drive of the chain 73. Sprockets 73A and 73B are mounted upon the upper end of the threaded power driven screws 67 and 68 and a driving element as a chain 73C is trained about the respective sprockets 73A and 73B so that the power driven screws are each rotated, in the same direction simultaneously.

A power driven shaft 75 is mounted within the head 66. A shelf 77 outwardly extends from one side of the supporting head 66 and a prime mover as an electric motor 78 is disposed thereupon. The shaft 75 is rotated at the same speed as that of the armature shaft with a flexible coupling 79 disposed therebetween.

A second arbor 80 is mounted within the lower part of the frame and the same is adapted for being driven by a prime mover as an electric motor 81. The shaft 80 is rotated at the same speed as that of the armature shaft with a flexible coupling 82 disposed therebetween.

Figures 1, 2, 3:
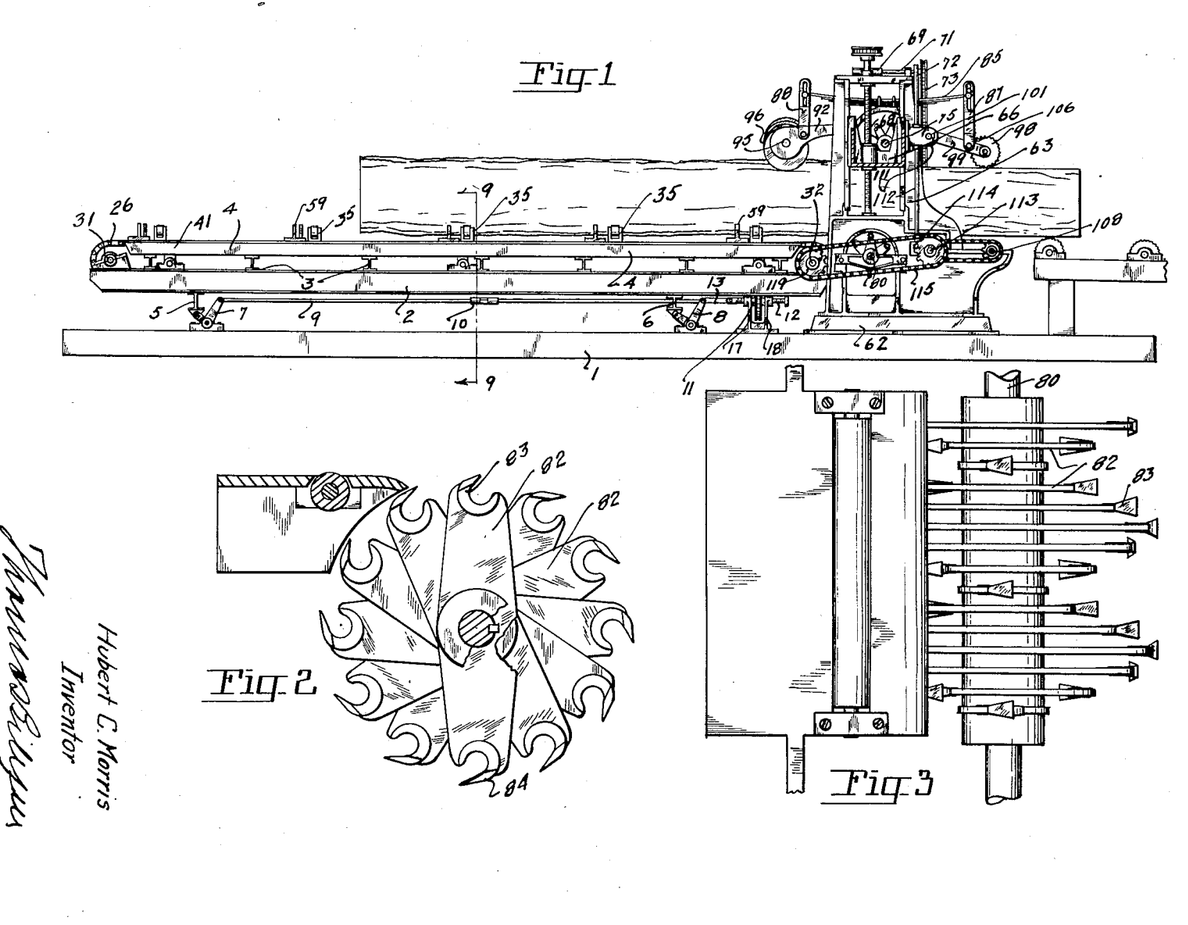
Fig. 1 is a sectional, side view of the assembled device illustrating a round log being passed therethrough and being flattened on the top and the bottom sides. The same being taken on the powered side of the mill.
Fig. 2 is a sectional, end view of the driving arbor upon which a plurality of spaced cutting members having inserted teeth are spirally disposed to form a dado head. The same also is a sectional side view of the table and of the platen roll over which the log is to be passed.
Fig. 3 is a top, plan view of the mechanism illustrated in Fig. 2.

Each of the arbors 75 and 80 carry a cutter head as illustrated substantially in detail in Fig. 2. These cutter heads are really dado heads made in a modified form. A plurality of balanced teeth supporting bars 82A are each keyed to the arbor. Inserted teeth 83 and 84 are mounted within the oppositely disposed ends of the balanced teeth supporting bars 82. The bars are staggered about the shaft so that the teeth may be removed as desired without the removal of the respective bars. The cutting edges of the removable teeth are made sufficiently wide to reduce the surface of the log to a single plane. The arbor 80 is journaled within stationary journal bearings disposed within the sides of the frame. A cushion spring 85, as a laminated spring, is mounted upon the supporting head 66, and is secured thereto by shackle bolts 86. Links 87 and 88 are supported upon pins 89 and 90 that are disposed in the oppositely disposed ends of the laminated spring and the links 87 and 88 each have slots 91 disposed therein to compensate for undue up and down movement of the links relative to the supporting pins 89 and 90. A pair of arms 92 and 93 are hingedly secured about a supporting shaft 94. A shaft 95 connects the outer ends of the respective links 92 and 93 together. A plurality of feed and positioning discs 96 are mounted upon the shaft 95. The positioning discs 96 have a substantially larger hole 97 disposed therein than the diameter of the shaft 95 upon which the same are mounted. The purpose is to permit the discs to conform to the contour surface of the log being fed thereunder. These discs are made relatively heavy to hold the log in position and to position the log and maintain the same in precise position. The slotted links and the cushion spring are provided to cushion the assembly when the end of the log passes thereunder, or when the same passes over enlargement of knots, or bumps.

A power driven feeding drum 98 is disposed in the outer end of the supporting links 99 and 100. The links are journaled about a supporting shaft 101. Teeth outwardly extend from the outer surface of the drum to contact with the surface of the log and to pull the same through the mill. The drum is removably secured to the shaft 103. A sprocket 104 is mounted upon the shaft 103 and a sprocket 105 is mounted upon the shaft 101. A chain 106 is trained about the respective sprockets 104 and 105 and drives the same.

A feed roller 107 is also mounted within the frame and the same is disposed upon a shaft 108. The shaft 108 is journaled within bearings 109 and 110.

The shaft 101 terminates in the gear box 111 in which a gear is mounted that is disposed upon the shaft 101. A shaft 112 vertically extends through the gear box 111 and a coacting gear is slidably disposed thereupon that coacts and drives the gear disposed upon the shaft 101. A shaft 113 is horizontally disposed within the frame and through a gear box 113A and a sprocket 114 is disposed thereupon. The sprockets and shaft are driven by a driving element as a chain 115. Coacting gears are disposed upon the shaft 113 so that as the shaft 113 is rotated, the shaft 112 will also be rotated.

A clutch 116 is mounted upon the shaft 32 and the clutch is adapted for being manually manipulated longitudinally of the shaft 32 by a hand lever 117. The clutch assembly is adapted to be engaged and disengaged from the hub 118 of the sprocket 119. When the clutch 116 is in engagement with the hub 118 the sprocket 119 is driven and when the sprocket 119 is driven the chain 115 is also driven. The purpose is to engage the mechanisms to be driven by the chain 115 when the clutch is engaged therewith and to render the same idle when disengaged.

I have found it desirable to run one of the arbors in one direction and the other of the arbors in the oppositely disposed direction in order to maintain a balanced relationship upon the log by the action of the respective cutter heads disposed upon the arbors.

The comminuted products developed by the lower arbor may be removed from the mill by any suitable conveyors, either mechanical, or pneumatic. The comminuted material developed by the upper arbor is preferably removed by pneumatic means and through the air eliminator shown in dotted position in Fig. 4 at 120. The electric motor 33 is preferably made a reversing motor.

Figure 12:
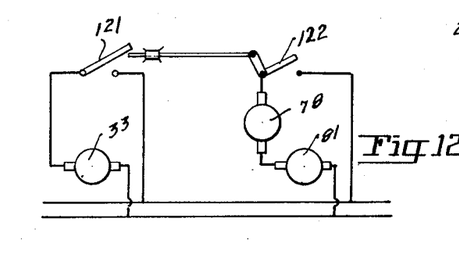
Fig. 12 is a diagrammatical layout of the electric prime movers and the switches associated therewith. The same is so arranged that electric current may not energize one of the motors in advance of the other of the motors.

Referring to Fig. 12, I have herewith illustrated a diagrammatical electrical layout, the purpose of which is to illustrate the electric connections that are so arranged that electric motors 78 and 81 must be started before the electric motor 33 can be started. This is accomplished through any suitable switch mechanism that prevents switch 121 from being closed in advance of the closing of the switch 122 that energizes the motors 78 and 81.

Where the log is being flattened upon the underside, only, the power driven feeding drum 98 is preferably made spiked. The power driven feeding drum 98 is removably secured to the power driven shaft 103 and when the upper surface of the log is flattened this drum is substituted for a spiked member that will contact the bark, or even surface of the log and feed the same, when the log has been flattened upon both the top and bottom side a feeding drum, having a corrugated surface proves effective and is substituted for the spiked drum.

A pulley 123 is mounted upon the lower arbor 80 and a pulley 124 is mounted upon the shaft 125 that drives the transmission elements disposed within the transmission case. A driving element, as a belt 126, is trained about the respective pulleys 123 and 124 and a belt tightener 127 rests upon the belt and maintains the same in a suitable taut driving condition. A reacting element as a coil spring 128 normally maintains the belt tightener out of engagement with the belt at which time the belt runs free about the pulleys and the transmission elements disposed within the transmission are in an idle condition. A foot lever 129 is rockably disposed about a supporting shaft 130 and a link 131 connects the foot lever with a bell crank 132 that manipulates the belt tightener into engagement with the belt and depresses reacting element 128.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a base, a secondary base superposed the base and in spaced relationship therewith, cross beams disposed transversely of the secondary base and disposed thereupon, longitudinally disposed beams disposed upon the cross beams, a plurality of cross beams disposed transversely of and beneath the secondary base adapted to support the secondary base, bell cranks journaled upon the base and adapted for supporting the cross beams disposed beneath the secondary base, a common rod secured to each of the bell cranks, power means for imparting longitudinal movement to the rod and thereby a rock-movement to the bell cranks and a raising and lowering movement to the subbase assembly, journal bearings disposed upon the secondary base shafts in said bearings, a plurality of sprockets disposed upon each of the shafts, endless chains disposed about the sprockets, log supporting elements disposed upon each of the chains and power means for imparting longitudinal movement to the chains and to the sprockets relative to the shafts upon which the same are mounted.

2. In a device of the class described, the combination of a base, a secondary base assembly disposed upon the base, and provided with power transmission means and supporting means and power conveying elements, power manipulative means for raising and lowering the log supporting and conveying assembly, selective, power manipulative means for positioning a log supporting cradle formed within the log supporting and transferring mechanism, a saw mill base disposed upon the base, a frame superposed the base, guide knees upwardly extending from the frame, a plurality of feed rollers journaled within the frame, an arbor journaled within the frame and being directly driven from an armature shaft of a prime mover, and an arbor adjustably supported within the guide knees, said last mentioned arbor being directly driven from the armature shaft of an electric motor disposed upon a shelf outwardly extending from the arbor supporting assembly, power means for raising and lowering the last mentioned arbor assembly and motor, wood cutting elements disposed in staggered relationship with each other, mounted upon each of the arbors, a cushioning spring supported within the upwardly extending guide knees, a slotted link depending from the oppositely disposed ends of the cushioning spring, pairs of hinged arms supported by the slotted links, and holding down and feeding drums journaled within the respective hinged arms.

3. In a device of the class described, the combination of a base, a saw mill supporting base disposed upon the first mentioned base, a frame superposed the base, a pair of guide knees disposed upon the oppositely disposed sides of the frame and upwardly extending therefrom, upper and lower arbors disposed within the assembly, the bearings for one of the arbors being fixed relative to the frame and the bearings for the other of the arbors being adapted for being raised and lowered within the upwardly extending pairs of knees, power means for raising and lowering the second arbor assembly, a cushioning spring supported upon the adjustable arbor supporting frame, slotted links downwardly extending from the oppositely disposed ends of the cushioning spring, a supporting shaft journaled within the adjustable arbor supporting frame, a pair of arms hinged about the shaft, a shaft disposed within the outer end of the pair of arms, feeding and positioning discs rotatably disposed about the shaft, each of the discs, having a hole substantially larger than the shaft upon which the same are supported, a power driven shaft disposed upon the oppositely disposed side of the adjustable arbor supporting frame, supporting arms journaled about the power driven shaft, a power driven shaft journaled within the outwardly disposed ends of the supporting arms and a feeding drum disposed upon the power driven shaft.

4. In a device of the class described, the combination of a primary base, a secondary base superposed the primary base, power means for raising and lowering the secondary base, a plurality of log supporting and conveying chains disposed within the secondary base, a log supporting cradle formed within the conveying means, power means for adapting the cradle to logs of varying diameters, power means for actuating the log supporting and conveying means, hand manipulative means for controlling the direction of movement of the conveying means and the operating speed thereof, a directly driven arbor disposed transversely of a frame disposed upon the primary base and a second arbor adjustably positioned within guide knees upwardly extending from the frame, power means for raising and lowering the last mentioned arbor assembly, and a plurality of discs mounted upon a common shaft, each of said discs being free to rotate about said shaft, and the holes in each of the discs, through which the shaft passes substantially larger than the shaft supporting the same and about which the same rotate.

5. In a device of the class described, the combination of an arbor directly driven by the armature shaft of an electric motor and at the same speed, a flexible coupling disposed between the armature shaft and the arbor, and secured respectively to the arbor and to the armature shaft, a common support for the arbor and the electric motor, power means for raising and lowering the arbor and motor assembly support, a cushioning spring secured to the arbor and motor support assembly, a power driven feeding roller suspended from one end of the cushioning spring, and a plurality of feeding discs suspended from the oppositely disposed end of the cushioning spring, said feeding discs being mounted upon a common shaft and for being independently rotated thereupon, the holes in said disc, through which the shaft passes being substantially larger than the shaft about which the same rotate.

6. In a device of the class described, the combination of an arbor and motor assembly, power means for raising and lowering the arbor and motor within a predetermined path of movement, a cushioning spring disposed transversely of the arbor and motor assembly and outwardly extending from either side thereof, a power driven feeding drum depending from one end of the cushioning spring, and a plurality of feeding discs mounted within a hinging frame, depending from the oppositely disposed end of the cushioning spring.

7. In a device of the class described, the combination of a base, a feeding carriage superposed one end of the base, power manipulative means for raising and lowering the feeding carriage relative to the base, the feeding carriage having a plurality of spaced endless chains disposed therein, power means for imparting feeding movement to the chains, spaced log supporting cradles disposed upon the respective chains, power means for moving the outside chains toward and away from the center chain, and a pair of arbors disposed in the line of travel of a log to be cut, the support for one of said arbors being fixed and the support for the other of said arbors adapted to be raised and lowered relative to the other of the supports for the arbors, and feeding elements disposed at the oppositely disposed sides of the adjustable arbor, one of said feeding elements being power driven.

8. In a device of the class described, the combination of a frame, a shaft journaled in either end of the frame, a plurality of sprockets disposed upon each of the shafts, one of the sprockets disposed upon each of the shafts being fixed relative to the shaft, the other of the sprockets being adapted for being moved longitudinally of the shaft and toward and away from the fixed sprocket, an endless conveyor chain disposed about each of the sets of sprockets, channel supports through which the lapping side of the conveyor chain rides and a plurality of spaced rollers disposed upon the center one of the chains and a plurality of spaced chocks disposed upon each of the other ones of the endless chains.

9. In a device of the class described, the combination of a fabricated frame, shafts journaled in the opposite ends of the frame, means for imparting rotation to one of the shafts, each of the shafts having a right hand thread and a left hand thread disposed thereupon and intermediate its ends, a fixed sprocket disposed centrally of each of the shafts and a sprocket disposed upon the threaded portion of the shaft and adapted for being threaded along and longitudinally of the shaft and toward and away from the fixed sprocket, an endless chain trained about each pair of the sprockets, and cradle supporting elements disposed upon the respective chains.

10. In a device of the class described, the combination of a frame, power means for imparting an up and down movement to the frame, a shaft journaled in each end of the frame, a sprocket fixed upon each of the shafts and a sprocket disposed upon each of the shafts and at either side of the fixed sprocket, means for imparting movement to the side sprockets longitudinally of the shaft and toward and away from the fixed sprocket, an endless conveyor chain trained about each of the sets of sprockets, cradle forming elements disposed upon each of the chains and spaced therealong, and the cradle forming elements disposed upon the center one of the chains being comprised of a plurality of rollers rotatably disposed within a housing block.

11. In a device of the class described, the combination of a cradle supporting frame, means for raising and lowering the frame, power driven chains associated with the frame, channel guideways for the chains, rollers and chocks associated with the frame and adapted for forming log supporting cradles therein, and means for adjusting the chains carrying the chocks toward and away from the chain carrying the rollers.

12. A new article of manufacture comprised of a pair of sprockets, each mounted upon an independent shaft, an endless chain disposed about the sprockets, means for driving one of the shafts upon which one of these sprockets is disposed, roller frames secured to the chain and spaced apart therealong, rollers journaled within the roller frames, the axial line of the rollers being disposed parallelly to the line of travel of the chain.

13. A new article of manufacture comprised of an endless chain, sprockets spaced apart and mounted upon power driven shafts about which the chain is trained, a plurality of roller frames removably secured to the chain, and extending transversely and outwardly from either side of the chain, and rollers journaled within the roller frame, the axial line of the rollers being disposed parallelly to the normal line of travel of the chain.

14. A new article of manufacture comprised of a pair of parallelly disposed shafts, one of which is power driven, a plurality of sprockets mounted upon each of the shafts, an endless chain trained about each pair of sprockets, roller frames carrying journaled rollers therein spaced along one of the chains, chocks spaced along each of the remaining ones of the chains, the roller frames and the rollers journaled therein and the chocks adapted to form a cradle support, and means for moving the chock carrying chains toward and away from the chain having roller frames secured thereto to form a cradle adapted for supporting logs of different diameters thereupon.

15. A new article of manufacture comprised of a plurality of shafts, a plurality of sprockets disposed upon each of the shafts, an endless chain disposed about each pair of sprockets, power means for driving one set of the sprockets, cradle forming elements spaced along the chains and upwardly extending therefrom, and adjustable means adapted for forming a cradle to support logs thereupon of different diameters.

16. In a device of the class described, the combination of a fabricated carriage frame, power means for raising and lowering the fabricated carriage frame, sprocket shafts journaled within the oppositely disposed ends of the carriage frame, frame supporting shafts, a right and left hand thread disposed upon each of the said supporting shafts, power means for driving one of the sprocket supporting shafts, three sprockets mounted upon each of the sprocket shafts, the center one of the sprockets being immovable with respect to its shaft, the other of the sprockets being adapted for being power moved longitudinally of the shaft and toward and away from the center sprocket, and a log supporting cradle disposed upon a plurality of chains trained about the respective sprockets.

HUBERT C. MORRIS.